United States Patent

Carlson et al.

Patent Number: 5,892,434
Date of Patent: Apr. 6, 1999

[54] AUTOMOTIVE DRIVING PATTERN MONITOR

[75] Inventors: David M. Carlson, 161 Canterbury Rd., Bloomfield Hills, Mich. 48304; Michael G. Lalonde, Alpharetta, Ga.

[73] Assignee: David M. Carlson, Bloomfield Hills, Mich.

[21] Appl. No.: 796,198

[22] Filed: Feb. 7, 1997

Related U.S. Application Data

[60] Provisional application No. 60/011,420 Feb. 9, 1996.

[51] Int. Cl.⁶ .................................................. B60Q 1/00
[52] U.S. Cl. ...................... 340/438; 340/439; 340/459; 340/462; 200/61.89
[58] Field of Search .................................. 340/438, 437, 340/452, 453, 459, 460, 461, 462, 479, 467; 200/61.89

[56] References Cited

U.S. PATENT DOCUMENTS

| | | | |
|---|---|---|---|
| 3,266,173 | 8/1966 | Sheridan | 35/11 |
| 3,266,174 | 8/1966 | Bechtol et al. | 35/11 |
| 3,594,921 | 7/1971 | Quicker, Jr. | 35/11 |
| 3,916,534 | 11/1975 | Riccio | 35/11 |
| 4,057,911 | 11/1977 | Sack | 35/11 R |
| 4,231,013 | 10/1980 | Freeman et al. | 340/479 |
| 4,439,824 | 3/1984 | Mayer | 364/150 |
| 4,916,431 | 4/1990 | Gearey | 340/479 |
| 4,933,852 | 6/1990 | Lemelson | 364/424.03 |
| 5,341,680 | 8/1994 | Smart et al. | 73/379.06 |
| 5,366,376 | 11/1994 | Copperman et al. | 434/69 |
| 5,368,484 | 11/1994 | Copperman et al. | 434/69 |
| 5,374,917 | 12/1994 | Hoffman et al. | 340/438 |
| 5,463,370 | 10/1995 | Ishikawa et al. | 340/69 |
| 5,499,182 | 3/1996 | Ousborne | 364/424.04 |
| 5,548,273 | 8/1996 | Nicol et al. | 340/439 |
| 5,653,515 | 8/1997 | Takeda et al. | 303/138 |

*Primary Examiner*—Thomas J. Mullen, Jr.
*Assistant Examiner*—Ashok Mannava
*Attorney, Agent, or Firm*—Gifford, Krass, Groh, Sprinkle, Patmore, Anderson & Citkowski, P.C.

[57] ABSTRACT

A system for sensing the manner of operation of an automotive vehicle and for generating feedback signals to the vehicle operator as a function of the manner of operation includes a pressure sensor connected to the brake pedal so as to generate a multi-state output signal as a function of the instantaneous pressure applied to the brake, and a plurality of acceleration sensors supported so as to sense the rate of change of the motion about different axes. The sensor output signals are all provided to a controller which compares their outputs to values stored in a table to generate one of a stored set of output values. An audio signal generator receives the output values and generates an audio feedback signal to the vehicle operator as a function of the status of the sensors. The system may also provide a signal to the vehicle engine to prevent operation of the vehicle when excessively erratic operation is detected.

7 Claims, 4 Drawing Sheets

AUTOMOTIVE DRIVING PATTERN MONITOR

RELATED APPLICATION

This application claims the benefit of U.S. Provisional Application No. 60/011,420 Filed Feb. 9, 1996 and entitled "Driver Performance Feedback System."

BACKGROUND OF THE INVENTION

Certain driving patterns such as repeated hard braking, riding the brake, tailgating, fast acceleration, and hard cornering can be hazardous to the driver, the passengers of other vehicles and pedestrians. Novice drivers are often unaware that their driving habits are improper, and even skilled drivers occasionally revert to poor driving practices without being aware of it.

The present invention is accordingly directed toward a system which may be installed on an automotive vehicle to detect various operating parameters, to analyze these parameters to detect specific hazardous practices and to provide feedback signals to the operator indicative of the improper driving practices. Certain embodiments of the invention could also disable operation of the vehicle when extremely erratic driving indicative of possible inebriation is detected.

A preferred embodiment of the invention, which will subsequently be disclosed in detail, employs a plurality of sensors disposed on the automotive vehicle, each of which provides a multi-value output signal to a controller. The controller has access to a memory storing a table of preset operating parameters. The controller compares the received signals from the sensors with the values stored in the memory to generate an output signal as a function of the comparison. The output signal is provided to a signal generator for providing an audio and/or visual signal for the vehicle operator. The feedback device preferably specifies the nature of the improper driving practice, such as tailgating, by the nature of the feedback signal.

In the preferred embodiment of the invention the driving pattern monitor may be applied to vehicles in the aftermarket by attaching a pressure sensor to the brake pedal and supporting the balance of the system, including an audio feedback device, on the brake pedal flange arm. An alternative embodiment of the invention employs a visual feedback device adapted to be supported on the vehicle dashboard. This unit incorporates the operator controls for the system as well as a visual display of the specific nature of operation detected.

Other aspects of the invention will be made apparent by the following detailed description of a preferred embodiment.

BRIEF DESCRIPTION OF THE DRAWINGS

The following description makes reference to the accompanying drawings in which.

DETAILED DESCRIPTION OF PREFERRED EMBODIMENT OF THE INVENTION

Figure 1:
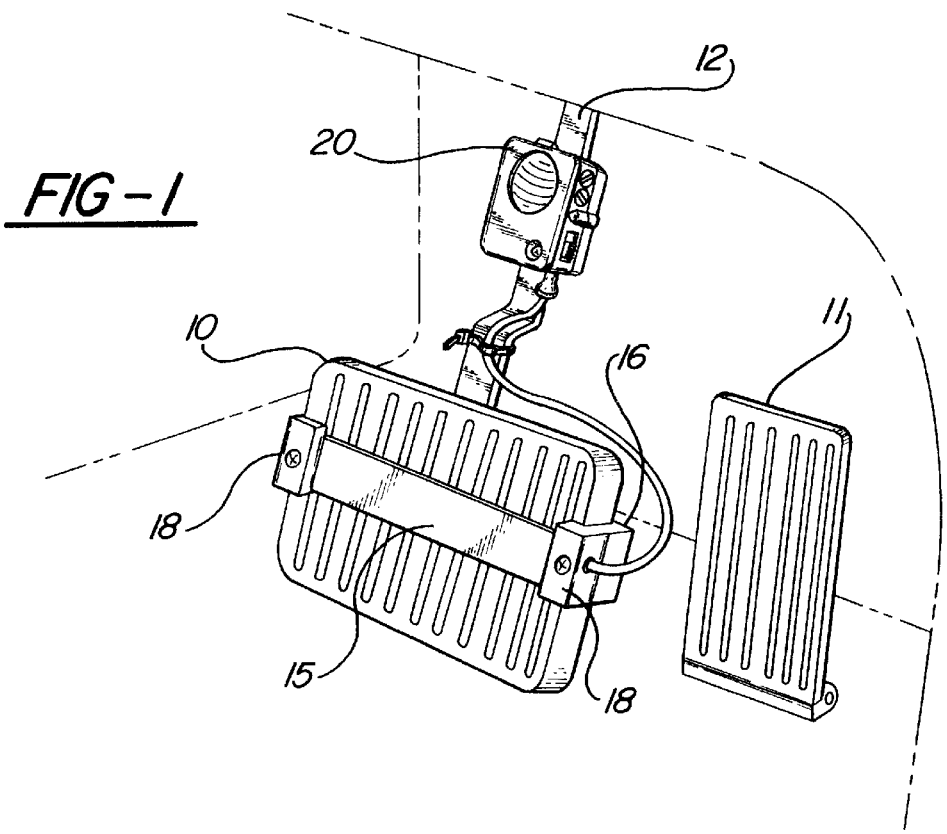
FIG. 1 is a perspective view of a first embodiment of our invention connected within an automotive vehicle on the brake pedal and the supporting brake flange arm.

A preferred embodiment of the invention installed within an automobile and supported on the brake pedal 10 and pivoting flange arm 12 which supports the brake pedal, is illustrated in FIGS. 1 through 4 of the drawings. The vehicle accelerator pedal 11 is illustrated to the right of the brake pedal. A pressure transducer consists of a front member 15 and a similar rear member 16 which are supported on opposed surfaces of the brake pedal and retained together by screws 18 which join the end blocks of the front member 15 and rear member 16. The unit incorporates a pressure sensor which is preferably of the piezoelectric variety. Alternatively, the pressure sensor may comprise a strain gauge or any other conventional form of device that generates an output signal either directly proportional to the pressure applied to the brake pedal or to the rate of change of pressure applied to the module.

A combination controller and audio feedback device, generally indicated at 20, is supported on the pivotable flange arm 12 which carries the brake pedal 10 on its lower end. In alternate embodiments of the invention the controller and feedback device 20 could be attached to other portions of the interior of the vehicle.

Figure 2:
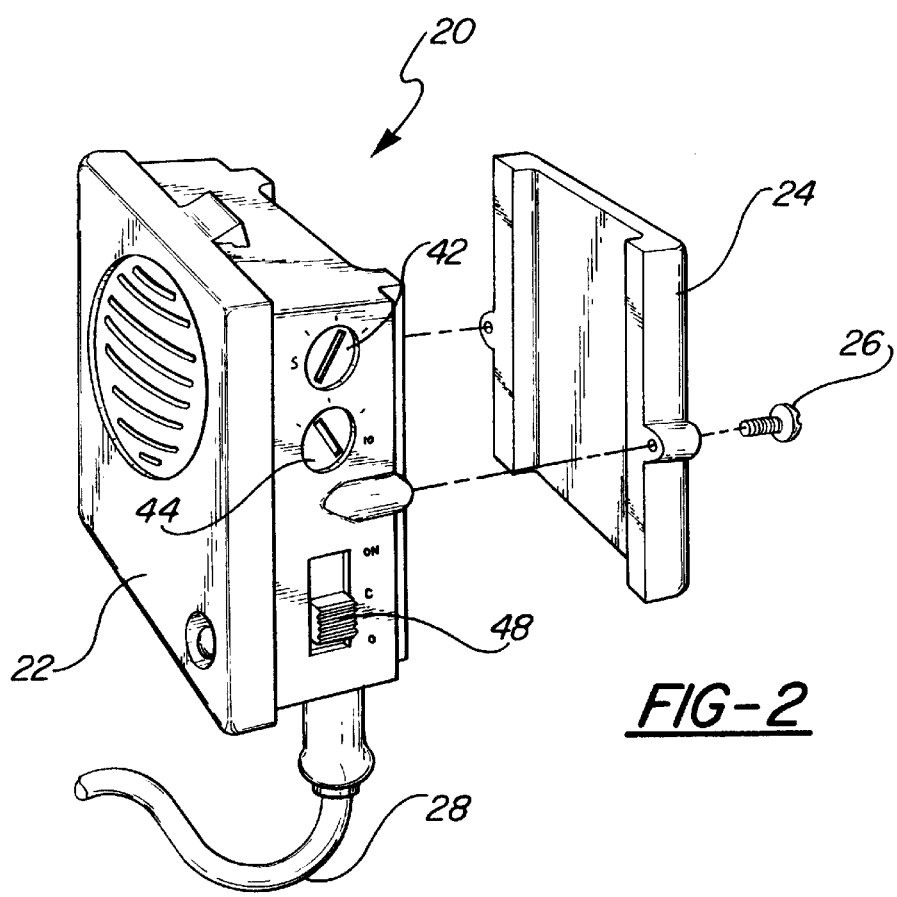
FIG. 2 is a partially exploded perspective view of the controller and audio response device forming part of the preferred embodiment of the invention.
Figure 3:
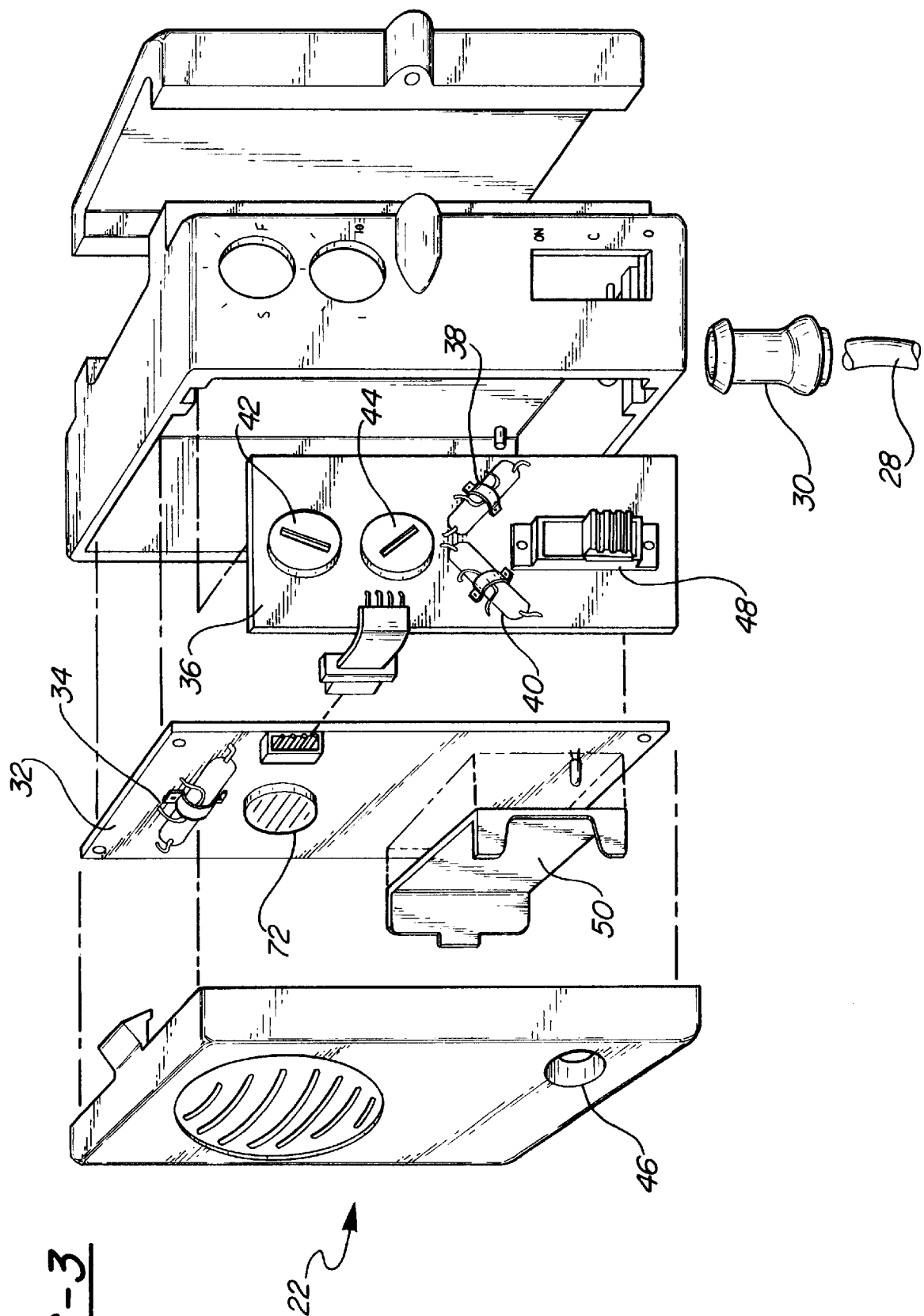
FIG. 3 is a fully exploded view of the controller and audio response device forming part of the preferred embodiment of the invention.

As illustrated in FIG. 2 the controller and audio feedback assembly 20 incorporates a main feedback module housing 22 and a rear clamp 24. The two are secured together so as to sandwich the brake pedal flange arm 12 by screws 26 which pass through ears formed on the sides of the main housing 22 and the rear clamp 24.

The brake pedal pressure sensor 14 is connected to the controller 22 by means of a flexible cable 28. A plastic fastener 30 supports the cable end 28 at the controller housing 22. A first circuit board 32 carried within the controller 22 supports an elongated inertia sensor 34 so that the sensor extends laterally of the central axis of the vehicle. Similarly, a second circuit board 36 supported within the controller housing 22 so that its surfaces extend parallel to the central axis of the vehicle and at right angles to the surfaces of the circuit board 32, carries a pair of inertia sensors 38 and 40 which are supported at right angles to one another and at oblique angles to the vertical. The inertia sensors 34, 38 and 40 each preferably consist of a sealed glass tube enclosing a ball of mercury or similar fluid conductive substance that occupies part of the tube volume. Each tube is formed with a pair of end electrodes and a pair of intermediate electrodes. When the vehicle accelerates laterally, as in a sharp turn, the electrodes attached to the inertia sensor 34 detect that motion and provide a suitable output signal. Similarly, acceleration in the forward direction or the rearward direction as occurs during braking are detected by the inertia sensors 38 and 40. The positioning of the sensors 38 and 40 at an angle to one another and to the vertical creates gravity resistance for the conductive substance within the tube to overcome thus providing contact closure only when significant inertia forces are exerted.

The orientation of the controller 22 on the brake arm is critical to the proper performance of the inertia sensors. The circuit board 36 supports two potentiometers 42 and 44 which are used in connection with an indicator light 46 on the front of the controller 22 to calibrate the inertia sensors for their positioning and sensitivity. The potentiometer 42 calibrates for position while the potentiometer 44 calculates for sensitivity. A calibration switch 48 on the side of the controller housing 20 is used during installation to place the system in a calibration mode wherein the indicator light 46 will be intermittently energized unless both of the potentiometers 42 and 44 are properly adjusted, at which point the indicator light will remain on continuously.

The circuit board 32 includes a battery clip 50 for supporting a battery which powers the unit as well as the other electronic components of the system (not shown).

Figure 4:
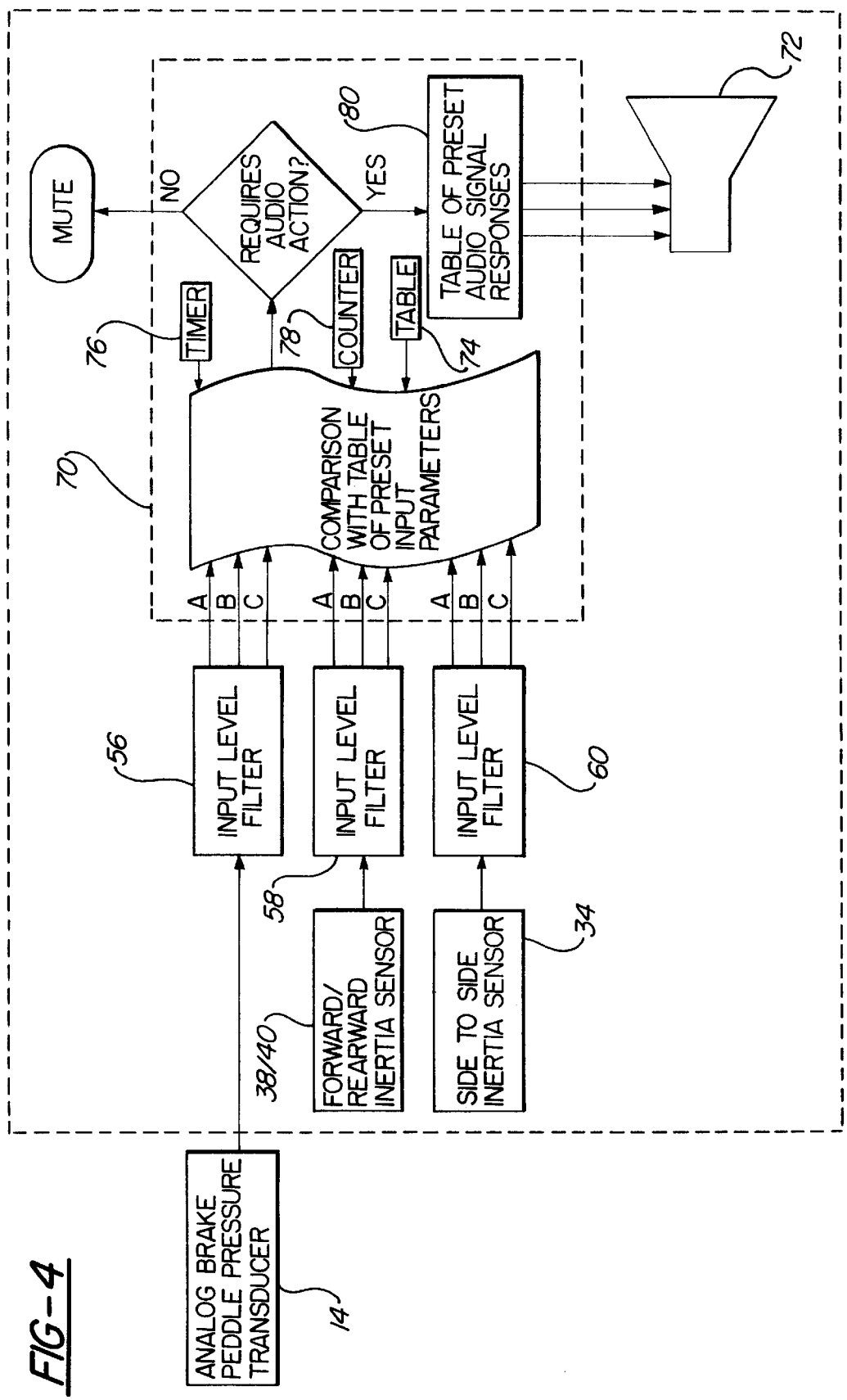
FIG. 4 is a schematic block diagram of the components forming part of the system of the preferred embodiment of my invention.

As indicated on the schematic diagram of FIG. 4, the multi-value signals from the pressure transducer 14, the forward and rearward inertia sensors 38 and 40 and the side to side inertia sensor 34 are provided to three input level filters 56, 58 and 60 respectively. The filters 58 and 60 include the potentiometers 42 and 44 for adjusting the level of their respective input signals. The filters 56, 58 and 60 filter out transient and undesirable signal levels and produce as outputs discrete binary signals on three sets of output for each filter, designated A, B and C. The following table sets forth the significance of each of the three binary digit outputs possible from each of the transducers.

These signals are provided to a controller 70 disposed within the unit 22 which performs the electronic signal processing required to generate an output signal for a feedback signal generator, in the preferred embodiment a loudspeaker 72 supported on the circuit board 32. The controller, in the preferred embodiment, represents a suitably programmed microprocessor, but could be formed of discrete electronic components. The function of the controller is preferably digital but could be analog in alternative embodiments.

The controller 70 includes a memory 74 storing a table of preset input parameters. The controller further incorporates or is programmed to generate a timer 76. It compares the input signals with the preset parameters stored in the memory 74, and the state of a timer 76 as well as a counter 78 to analyze the input signals and generate an appropriate output signal. This operation is summarized by the following table. The audio response generator 80 generates the indicated audio signal as a feedback signal to the driver.

TABLE OF PRESET PARAMETERS

| Inputs | | | Explanation of Signal | Conditional Timer | Conclusion | Counter | Table of Preset Audio Signal |
|---|---|---|---|---|---|---|---|
| A | B | C | | | | | |
| 1 | 0 | 0 | Transducer 14: Maximum Pressure | >3 Seconds | Hard Braking | 1 Count in 0 Seconds | Continuous High Tone for Duration of Condition |
| 0 | 0 | 1 | Forward Inertia Sensor 38: Contact Closure Maximum Range | | | | |
| 0 | 0 | 1 | Transducer 14: Minimum pressure | >5 Seconds | Riding Brake | 5 Count in 500 Seconds | Continuous Low Tone for Duration of Condition |
| 0 | 0 | 0 | Forward Inertia Sensor 38: Contact Open | | | | |
| 0 | 1 | 0 | Transducer 14: Medium pressure | >3 Seconds | Tailgating | 3 Counts in 300 Seconds | 3 High Tones 2 Second Duration Each for Duration of Condition |
| 0 | 1 | 0 | Forward Inertia Sensor 38: Contact Closure Mid Range | | | | |
| 0 | 1 | 0 | Transducer 14: No pressure | >5 Seconds | Acceleration | 3 Counts in 1000 Seconds | 6 Low Tones 2 Second Duration for Each Additional Incident |
| 0 | 0 | 0 | Rearward Inertia Sensor 40: Contact Closure Maximum Range | | | | |
| 1 | 0 | 0 | Side to Side Inertia Sensor 34: Contact Closure Maximum Range Left -or- | >3 Seconds | Hard Cornering | 1 Count in 0 Seconds | 3 Low Tones 2 Second Duration Each for Duration of Condition |
| 0 | 0 | 1 | Side to Side Inertia Sensor 34: Contact Closure Maximum Range Right | | | | |

TABLE OF BINARY CODES

| | | | |
|---|---|---|---|
| Pressure Transducer Sensor 14 | 1 0 0 | | Maximum Pressure Signal Output |
| | 0 1 0 | | Medium Pressure Output |
| | 0 0 0 | | No Pressure Output |
| Forward/Rearward Inertia Sensor 38/40 | 0 0 1 | | Forward Motion Contact Closure |
| | 0 1 0 | | Mid Range Contact Closure |
| | 1 0 0 | | Rearward Motion Contact Closure |
| Side to Side Inertia Sensor 34 | 1 0 0 | | Left Motion Contact Closure |
| | 0 0 0 | | Resting - No Contact Closure |
| | 0 1 1 | | Right Motion Contact Closure |

Figure 5:
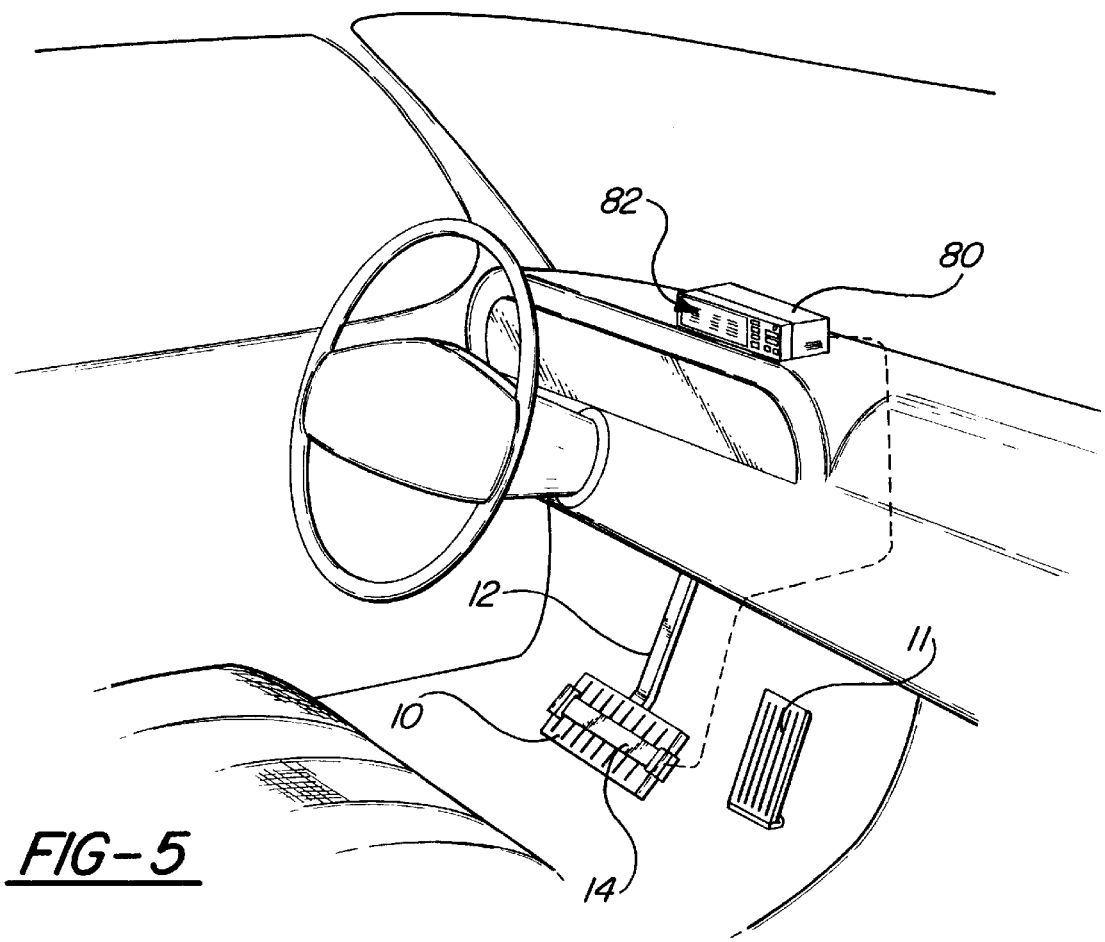
FIG. 5 is a perspective view of the interior of the driver's compartment of an automobile incorporating a second embodiment of the invention utilizing a visual feedback device.
Figure 6:
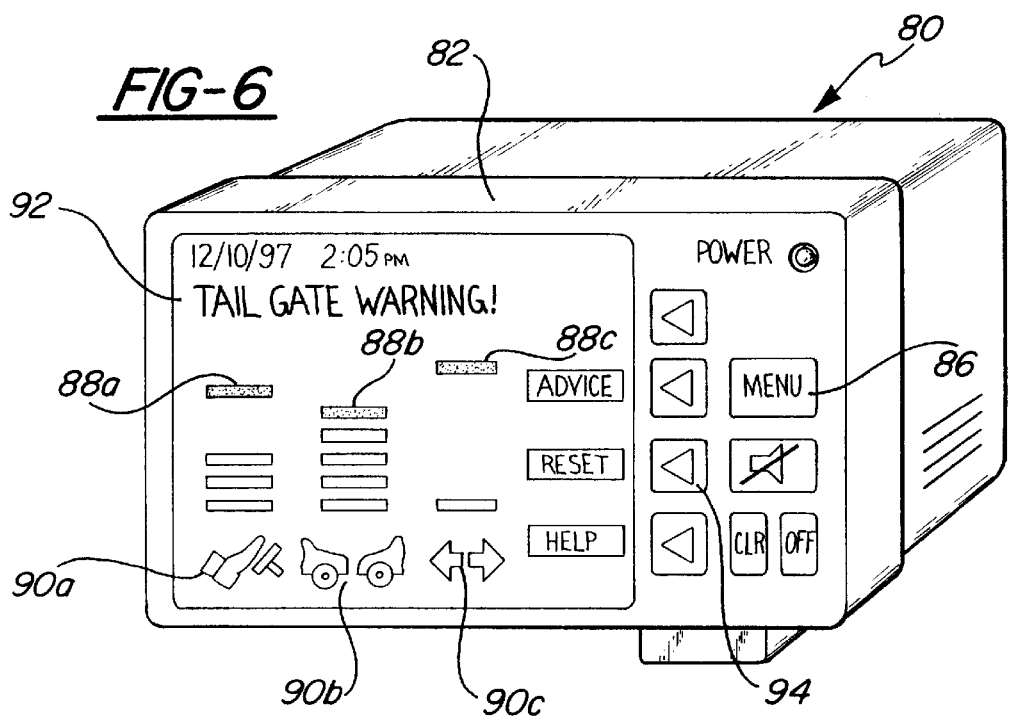
FIG. 6 is a perspective view of the visual feedback device incorporated in the second embodiment of my invention.

FIGS. 5 and 6 illustrate an alternative embodiment of the invention in which the controller is built into a dashboard supported unit, generally indicated at 80. The dashboard mounted unit 80 incorporates a display 82, preferably a full backlit dot matrix liquid crystal display, permitting individual mapping and control of each pixel. The display 82 generates graphics to represent the state of the cumulative occurrences of the predetermined driving pattern offenses detected by the system. Preset limits to occurrences before an alert condition exists are indicated by bars 88A, B and C for predetermined driving pattern offenses denoted by the icons 90A, 90B and 90C. The icon 90A refers to hard braking or riding the brake, the icon 90B to tailgating, and icon 90C to cornering. When an alert occurs a scrolling alphanumeric message 92 will clearly display the specific warning. Simultaneously, the affected column and icon will blink on and off until a reset button 94 is depressed. The system uses soft keys displayed on the display 82 in association with a hard operator actuated key such as 94.

In alternative embodiments of the invention the system could store a plurality of different databases for multiple users and the user could enter a user number to select an appropriate database. The system might further incorporate interface relay output contacts for an alarm system to disengage the engine if the device detects driving patterns associated with hazardous driving or inebriation. The system might have a memory to record operation for later downloading by authorized persons. It might incorporate a port to communicate with a personal computer to upload or download data. It might further include an internal printer, preferably of the thermal type, to print occurrence results and statistics. Such a printout could include the subject user's identification when used for instructional purposes.

A ground position satellite device might be used to record the specific location of driving habit violations for downloading to a computer for printout and analysis. The memory might additionally accumulate data over a number of days to permit the study of a particular driver's performance over time.

The system might couple to the brake system at some point such as the master cylinder instead of incorporating a pressure transducer on the brake pedal.

Having thus described our invention we claim:

1. A system for use in connection with an automotive vehicle having a brake pedal supported by a pivotal flange arm, comprising:
    a pressure sensor affixed to the pedal operative to provide a continuous analog output signal as a function of the instantaneous pressure applied to said pedal;
    an audio output device connected to the brake pedal flange arm; a memory storing a table of preset operating parameters; and
    a controller, operative to receive signals from said pressure sensor and to control the generation of output signals by the audio output device as a function of the sensor signals and of values stored in said memory to provide one of a plurality of audio output signals.

2. The system of claim 1 further including a plurality of inertial sensors supported on said brake pedal flange arm and operative to generate multi-state signals as a function of the dynamic condition of the vehicle, said inertia sensors being connected to said controller to modify the audio output signals generated.

3. The system of claim 2 where said plurality of inertia sensors comprises one inertia sensor supported so as to extend transversely to the longitudinal axis of the vehicle and a pair of inertia sensors supported at right angles to one another in a plane aligned with the longitudinal axis of the vehicle.

4. The system of claim 2 where said controller is supported on the brake pedal flange arm.

5. The system of claim 1 in which said controller constitutes a suitably programmed general purpose microprocessor.

6. The system of claim 1 wherein the output signals of the audio output device consist of a plurality of tones, certain of which have differing timing to provide the driver of the vehicle with feedback as to the operating condition of the vehicle.

7. A system for use in connection with an automotive vehicle having a brake pedal, comprising:
    a pressure sensor affixed to the pedal operative to provide an output signal having a value which is a function of the instantaneous pressure applied to the pedal;
    a plurality of inertia sensors supported on the vehicle, said sensors including a first sensor supported to detect acceleration along an axis normal to the longitudinal axis of the vehicle, and second and third sensors supported to detect acceleration along axes normal to each other and in the plane of the longitudinal axis of the vehicle;
    a memory storing a table of output signals versus signals from said brake sensor and said inertia sensors;
    a controller connected to receive the signals from said brake sensor and said inertia sensors and to use the said memory table to generate one of a plurality of output states; and
    a driver warning device operative to generate one of a plurality of signals as a function of the outputs of the controller.

* * * * *